April 7, 1931. H. B. NORCROSS 1,799,386
ATTACHMENT FOR RUBBER GOODS TRIMMING MACHINES
Filed Nov. 11, 1929
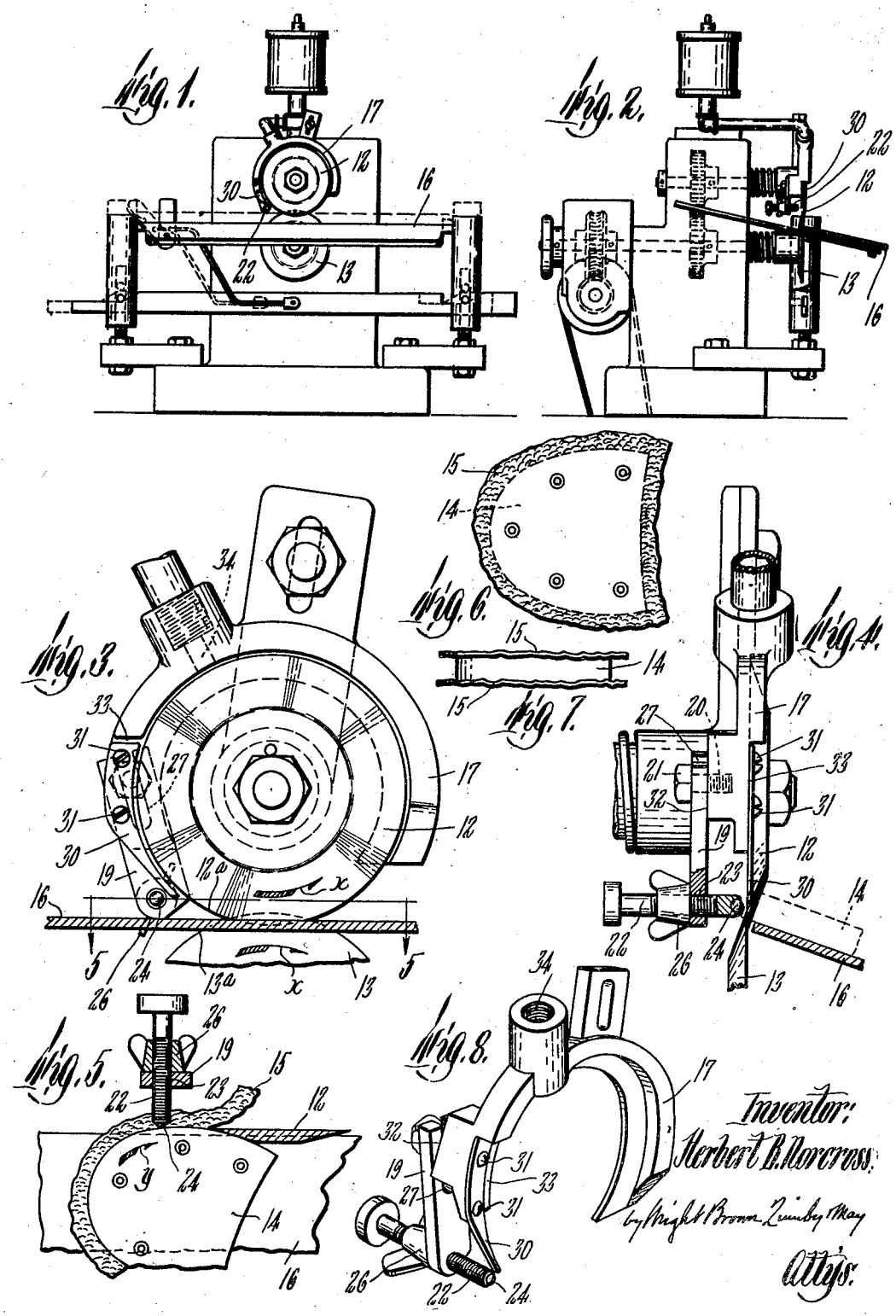

Patented Apr. 7, 1931

1,799,386

UNITED STATES PATENT OFFICE

HERBERT B. NORCROSS, OF BROCKTON, MASSACHUSETTS

ATTACHMENT FOR RUBBER-GOODS-TRIMMING MACHINES

Application filed November 11, 1929. Serial No. 406,336.

This invention relates to a trimming machine adapted to trim from molded rubber articles, such as rubber heels and soles for foot wear, fins left on said articles by the molding operation, the machine including a pair of cooperating disk knives, a work-supporting table on which work to be trimmed is supported, while being moved on the table by the operator, to cause the removal, by the knives, of a fin projecting from a molded edge portion of the work, and an arcuate housing located adjacent the table and partly surrounding one of the knives.

A machine characterized as above stated, is disclosed by Letters Patent to Wills, trimming machine for rubber goods, No. 1,577,508, dated March 23, 1926, the hereinafter described attachment in which my invention is embodied being applicable to said machine, although not limited to use with a machine organized in all respects as shown by said patent.

The object of the invention is to provide an attachment for a machine of the type referred to whereby liability of injury to the molded edge portion of the work by the knives is practically eliminated, the operator is protected against liability of injury by contact of a hand with the knives, and other desirable results are obtained.

Of the accompanying drawings forming a part of this specification—

Figure 1 is a front elevation of a rubber goods trimming machine provided with an attachment embodying the invention.

Figure 2 is a side view of the same.

Figure 3 is an enlargement of a portion of Figure 1, the table being shown in section.

Figure 4 is an edge view of the portion shown by Figure 3, certain parts being shown in section.

Figure 5 is a section on line 5—5 of Figure 3, and shows a rubber heel partly trimmed.

Figure 6 is a plan view,

Figure 7 an edge view of a rubber heel as it appears before trimming, and

Figure 8 shows in perspective a part of the machine shown by Figures 1, 2, 3 and 4, and the attachment embodying my invention carried by said part.

The same reference characters indicate the same parts in all of the figures.

12 and 13 designate the disk knives of a trimming machine adapted to trim from the molded edge face of a rubber article 14, such as a molded rubber heel or cushioning lift, the fins 15 which project from said edge face when the article is removed from the mold in which it is formed. The article with its fins is hereinafter termed the work.

16 designates the table on which the work is supported and moved by the operator during the trimming operation.

17 designates an arcuate housing which is a fixed part of the machine and partly surrounds the outer or upper knife 12.

The general organization of the machine, including the means for rotating the knives in the directions indicated by the arrows $x$, $x$ in Figure 3, may be as shown by the above-mentioned Wills patent, to which I refer as an example.

The operator moves the work on the table 16, in such manner as to cause the acting portions of the knives, designated by 12a and 13a in Figure 3, to trim the fins 15 from the edge faces of the work. When the work has two fins, as shown by Figure 7, the fins are trimmed off by two operations as usual. Figure 5 shows a heel from which one fin, and a portion of the other, have been removed in the usual way.

The attachment in which my invention is embodied, comprises a holder 19, fixed to an end portion of the housing 17, and a work-guiding abutment engaged with the holder and including a terminal adapted to have a limited bearing on the molded edge face of the work adjacent a fin 15 projecting therefrom.

The holder 19 is preferably an oblong arm secured at one end to the housing 17, by clamping screw 20, engaged with a tapped orifice in the housing and having a head 21, adapted to clamp the holder against a flat seat on the housing, as best shown by Figure 4.

The guiding abutment includes a screw-threaded stud or body 22, engaged with a tapped orifice 23 in the holder, the above-mentioned terminal, adapted to have a limited bearing on the work, being preferably anti-frictional and composed of a ball 24 rotatable in a socket formed in one end of the body 22.

The abutment 24 is located slightly higher than the table 16, and is spaced from the acting portions of the knives, as indicated by Figures 3 and 5, so that the operator, moving the work in the direction of arrow y, causes the removal of a fin 15 from the work by the knives. The spacing of the terminal 24 from the acting portions of the knives is such that the terminal prevents the knives from cutting the previously molded edge face of the work, thus eliminating liability of the cutting or nicking of said edge face by the knives, which would exist if the abutment terminal were not employed, the spoiling of heels and the consequent waste being therefore elminated. Said terminal also acts to protect the operator's hand or hands manipulating the work, by preventing a member or members of the hand from accidentally contacting with the acting portions of the knives.

The pivotal connection of the holder 19 with the housing 17, by the headed screw 20, enables the abutment to be adjusted toward and from the acting portions of the knives, to adapt the machine to operate on heels of different sizes, the holder being positively secured in any adjusted position by the head 21 of the clamping screw.

The abutment is adjustable endwise by rotating it in the tapped orifice 23 of the holder, and may be positively secured at any desired adjustment by a jam nut 26, engaged with the threaded body 22, and set up against the holder.

The screw 20 passes through a longitudinal slot 27 (Figure 3) in the holder, so that the latter is adjustable endwise to additionally vary the position of the abutment.

The anti-frictional terminal 24, in rolling contact with the molded edge face of the work, enables the operator to move said face with a minimum of frictional resistance while pressing it against the terminal.

The acting portions 12a and 13a of the knives form a V-shaped recess, the apex of which is spaced from the abutment terminal 24, as shown by Figure 3. The acting portion 12a is therefore necessarily exposed between the terminal and the apex of the recess, so that there is some liability of contact between a member of the operator's hand and the portion 12a, although such liability is less than it would be without the abutment which protects the operator to a considerable extent.

To additionally protect the operator, I provide as an element of my attachment, a finger 30 having a shank portion attached by screws 31 to the housing 17, and a free end portion which is tapered to a thin end and projects between the terminal 24 and the knife edge portion 12a, and prevents the possibility which would otherwise exist of accidental contact of a member of the operator's hand with the portion 12a. The tongue 30 is made of metal, and its tapered portion is preferably resilient.

The housing 17 in the machine of the above-mentioned Wills patent, is provided with an oil duct 34, admitting oil to the upper portion of the cutting edge of the knife 12. Some of the oil flows downward along the tongue 30, and drops therefrom on to the portion of a fin 15, which is being severed by the knives, so that the lubricating oil is desirably distributed.

I have modified the housing 17 by forming thereon an offset seat 32, for the holder 19, and an inset seat 33, for the tongue 30, as best shown by Figure 8. Said seats are arranged to locate the holder and the abutment and the tongue 30 in their proper operative positions. My attachment may, therefore, be installed in a machine organized as shown, by substituting the modified housing 17 for one not provided with the attachment.

I claim:

1. In a trimming machine which includes a pair of cooperating disk knives, a work-supporting table on which work to be trimmed is supported while being moved on the table by an operator, to cause the removal by the knives of a fin projecting from a molded edge portion of the work, and an arcuate housing located adjacent the table and partly surrounding one of the knives, an attachment associated with said housing and table and comprising a holder fixed to an end portion of the housing, a work-guiding abutment engaged with said holder and including a terminal adapted to have a limited bearing on said work edge portion adjacent a fin projecting therefrom, and to permit movement of the work on the table by the operator, to cause the removal of a fin by the knives, the abutment terminal being arranged to prevent the knives from cutting said edge portion, and to protect the operator.

2. An attachment as specified by claim 1, the said abutment including a body portion engaged with the holder, and an anti-frictional terminal portion adapted to have a rolling contact with said work edge portion.

3. An attachment as specified by claim 1, the abutment holder being pivotally connected with the housing by a clamping bolt permitting a swinging adjustment of the holder and abutment, and adapted to positively secure the holder in any adjusted position.

4. An attachment as specified by claim 1, the said abutment including a screw-threaded body portion engaged with a tapped orifice in the holder and longitudinally adjustable by rotation, and a terminal portion adapted to have a limited bearing on said work edge portion adjacent a fin projecting therefrom, means being provided for positively securing the body portion in any position to which it may be adjusted in the holder.

5. In a trimming machine which includes a pair of cooperating disk knives, a work-supporting table on which work to be trimmed is supported while being moved on the table by an operator, to cause the removal by the knives of a fin projecting from a molded edge portion of the work, and an arcuate housing located adjacent the table and partly surrounding one of the knives, an attachment associated with said housing and table and comprising a holder fixed to an end portion of the housing, a work-guiding abutment engaged with said holder and including a terminal adapted to have a limited bearing on said work edge portion adjacent a fin projecting therefrom, and to permit movement of the work on the table by the operator, to cause the removal of a fin by the knives, the abutment terminal being arranged to prevent the knives from cutting said edge portion, and to protect the operator, said attachment comprising also a flexible tongue fixed at one one end to the housing and having a free end interposed between the abutment terminal and the acting portions of the knives.

6. In a trimming machine of the character stated, an arcuate housing partly surrounding a disk knife, and provided with an offset seat at one side, an inset seat in the opposite side, an abutment holder secured upon the offset seat and provided with a guiding abutment, and a tongue secured upon the inset seat and having a free end located beside the abutment.

In testimony whereof I have affixed my signature.

HERBERT B. NORCROSS.